United States Patent Office 2,722,303
Patented Nov. 1, 1955

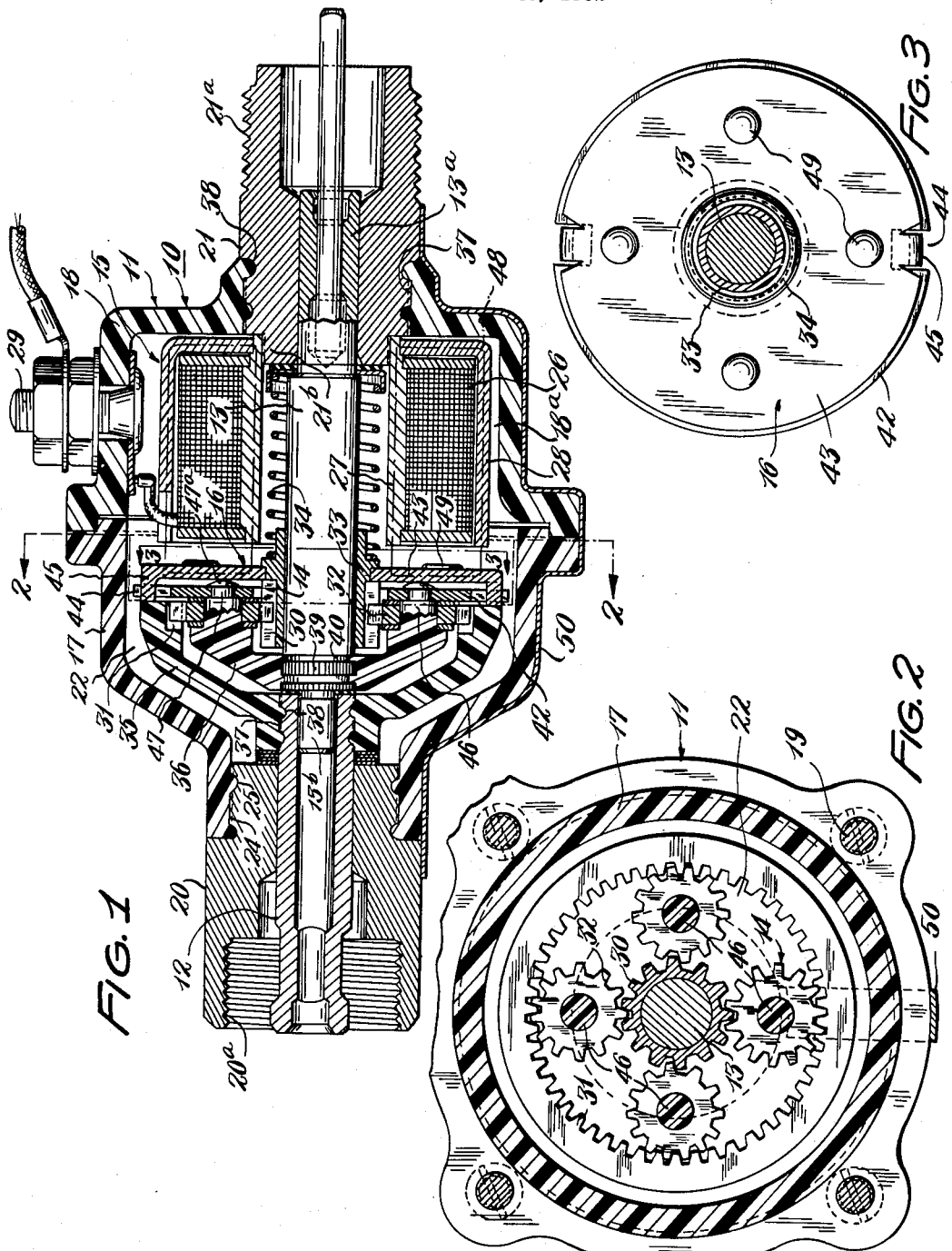

2,722,303
MAGNETIC CLUTCH FOR CHANGE SPEED GEAR DEVICE

George Utz, Gates Mills, Ohio, assignor to Eaton Manufacturing Company, Cleveland, Ohio, a corporation of Ohio Application February 13, 1952, Serial No. 271,326

4 Claims. (Cl. 192—90)

This invention relates to speed change gear devices and, more particularly, to an improved electromagnetic clutch construction for a gear device of this kind. This clutch controlled gear device can be used to advantage in speedometer drives and for a variety of other purposes.

An object of the invention is to provide an improved construction for an electromagnetic clutch in which certain component members of the device are made of non-magnetic material, such that the flux produced by the electromagnet will be concentrated in a closed-loop local path thereby decreasing the flux loss and rendering the electromagnet more effective for accomplishing its control function.

Another object is to provide an improved construction for an electromagnetic clutch of this character in which the housing of the clutch comprises housing members made of a molded non-magnetic material such that these parts will be lighter in weight, can be more economically produced and will decrease flux loss such that a greater actuating force will be developed by an electromagnet of a given size and ampere-turn rating.

As an additional object, this invention provides such an improved clutch device in which the housing members are molded from a non-metallic plastic material and are connected with a pair of bearing members for the input and output shafts by being molded at least in part around such bearing members, and in which conductor means supported by the wall of the housing electrically connects the bearing members for establishing a conductive path through the device.

The invention can be further briefly summarized as consisting in certain novel combinations and arrangements of parts hereinafter described and particularly set out in the claims hereof.

In the accompanying sheet of drawings:

Fig. 1 is a longitudinal section taken through a magnetic clutch controlled speed change device embodying the present invention;

Fig. 2 is a transverse section taken through the device on section line 2—2 of Fig. 1; and Fig. 3 is a partial transverse section taken on section line 3—3 of Fig. 1.

The speed change device 10, with which the novel electromagnetic clutch of this invention is associated comprises in general a housing 11 having a pair of input and output shafts 12 and 13 rotatable thereoin, and a set of planetary gearing 14. Clutch means 16 of the novel electromagnetic clutch is responsive to an electromagnet 15 and is effective on the planetary gearing for varying the transmission ratio between the shafts.

The housing 11 comprises a pair of cup-shaped complemental housing members 17 and 18 having their adjacent ends connected together by suitable bolts or rivets 19, and provided at their outer ends with hollow bearing members 20 and 21 in which the shafts 12 and 13 are rotatable. The housing member 17 defines a gear chamber 22 in which the planetary gearing 14 is located. The housing member 18 defines a casing in which the electromagnet 15 is disposed with an intervening annular air space 18ª therebetween.

In accordance with one feature of the present invention, the housing 11 is formed either entirely, or to a major extent, of a molded non-magnetic material. In the construction here shown, the housing members 17 and 18, with the exception of the bearing members 20 and 21, are formed entirely of such a molded non-magnetic material. The molded non-magnetic material can be suitable plastic as is shown in this instance, such as a synthetic resin, for example, Bakelite or, if desired can be a suitable metal such as brass, aluminum or aluminum alloy.

When the housing members 17 and 18 are molded from a non-metallic plastic material, the bearing members 20 and 21 can be separate parts formed of metal as here shown, but when the housing members are made of metal the bearing members 20 and 21 can be formed as integrally molded portions of the housing members. The bearing members 20 and 21 are provided with threaded portions 20ª and 21ª at their outer ends for use in attaching to the housing 11 the sheaths of the flexible cables or the like which are to be connected with the input and output shafts 12 and 13.

When the molded portions of the housing members 17 and 18 are made of plastic and the bearing members 20 and 21 are separate parts made of metal, as here shown, the molded portions of the housing members are connected with the bearing members by being molded in place thereon and interlocked therewith. For this purpose, the bearing members 20 and 21 are provided at the inner ends thereof with a roughened or irregular surface characteristic formed by knurling or the like 24 and by one or more annular grooves 25 extending around these bearing members. When the housing members 17 and 18 are being produced, an interlock will thus be formed between the molded portions of these housing members and the metal bearing members 20 and 21.

The input shaft 12 is here shown as being a hollow metal shaft member which is rotatable in and extends through the bearing member 20, such that the inner end of this shaft member projects into the gear chamber 22. The output shaft 13 is disposed in axial alignment with the input shaft 12 and extends through the electromagnet 15. This output shaft is provided at its outer end with a reduced portion 13ª which is rotatably supported in the bearing member 21. The inner end of the output shaft 13 is provided with a reduced stem portion 13ᵇ which extends axially into, and is rotatably supported by, the inner end of the hollow input shaft 12.

In accordance with another feature of this invention, the output shaft 13 is made of a non-magnetic metal, such as brass. The non-magnetic character of the output shaft 13 is advantageous to the magnetic circuit of the magnet 15, as will be further explained hereinafter.

The electromagnet 15 comprises an annular magnet coil 26 disposed around a hollow metal magnet core 27 and an outer metal magnet frame member 28 disposed around the magnet coil. One end of the winding of the magnet coil 15 is grounded on the metal structure of the gear device and the outer end of the magnet winding is connected with a terminal member 29 carried by the housing member 18. When the housing member 18 is formed of a molded non-metallic electric insulating material as mentioned above, the terminal member 29 can be mounted directly in an opening of this housing member without need for any additional electric insulation.

The bearing member 21 is provided at its inner end with an extension or pilot portion 21ᵇ which engages in the adjacent open end of the inner core 27. This engagement of the pilot portion 21ᵇ in the opening of the core 27 provides a good electrical ground connection between these metal parts and also serves to support the electromagnet 15 in the housing member 18 so as to maintain the air space 18ᵃ therebetween.

The planetary gearing 14 comprises an inner sun gear 30, an outer ring gear 31 and a group of planet gears or pinions 32 disposed between and meshing with such sun gear and ring gear. The sun gear 30 is formed on a sleeve 33 which is axially slidable on the output shaft 13 and is engaged by a compression spring 34 which is disposed in surrounding relation to the output shaft.

The planetary gearing 14 also comprises a carrier 35 for the ring gear and a second carrier 36 for the planet gears 32. The gear carriers 35 and 36 are made of a molded non-magnetic material, preferably a suitable non-metallic plastic such as nylon although, if desired, they can be molded or die-cast from a suitable non-magnetic metal such as aluminum or aluminum alloy.

The gear carrier 35 is mounted on the inner end of the input shaft 12 and, in accordance with the present invention, is molded in place thereon. For this purpose, the inner end of the shaft 12 is provided with a roughened surface characteristic, formed by knurling or the like 37 and by one or more grooves 38 extending annularly around this shaft member, and with which an interlock is formed during the molding of the carrier 35. The gear carrier 36 is mounted on the output shaft 13 adjacent the inner end thereof by being molded in place on this shaft. The output shaft is likewise provided for this purpose with a roughened surface characteristic, formed by knurling or the like 39 and by one or more grooves 40 extending around this shaft, and with which an interlock is formed when the carrier 36 is molded in place on this shaft.

The clutch means 16 comprises a clutch ring 42 mounted on the gear carrier 36, and a shiftable clutch plate 43 mounted on the sleeve 33 of the sun gear and which also forms a movable armature for the electromagnet 15. The clutch ring 42 is provided at the periphery thereof with a pair of substantially diametrically opposed notches 44 adapted to receive similarly located clutch fingers 45 carried by the clutch plate 43. The clutch ring is made of a non-magnetic material such as brass.

When the electromagnet 15 is in a deenergized condition, the compression spring 34 holds the clutch plate 43 in the position shown in Fig. 1 in which the clutch fingers 45 engage in the notches 44 of the clutch ring 42. This produces a locked condition of the planetary gearing 14 such that the input and output shafts 12 and 13 will be connected by the gearing in a direct one-to-one ratio. When the electromagnet 15 is energized, it shifts the clutch plate 43 toward the right against the action of the spring 34 thereby disengaging the clutch fingers 45 from the notches 44 of the clutch ring 42. This permits relative rotation between the gear carriers 35 and 36, such that the planetary gearing 14 will be effective to produce a speed variation between the input and output shafts 12 and 13. When the electromagnet 15 is deenergized, the spring 34 returns the clutch plate 43 to its engaged position to automatically re-establish the direct-connected relation between the shafts 12 and 13.

Reverting to the planetary gearing 14 and to the gear carrier 36 thereof, it will be observed that the planet gears 32 are mounted on this carrier by being journalled on pins 46 which are formed as integrally molded extensions of the body of this carrier. The clutch ring 42 is connected with the carrier 36 by being mounted on axial stem extensions 47 of the journal pins 46. The stem extensions 47 project through suitably located openings in the clutch ring 42 and have integrally formed heads 47ᵃ which retain the clutch ring in connected relation with the gear carrier 36.

With the construction and arrangement above described, it will be seen that the flux path for the electromagnet 15 will be a substantially closed-loop localized path extending through the core sleeve 27, the outer frame member 28 and the clutch plate 43 substantially as represented by the broken line 48. Since those parts of the gear device 10 which are in an adjacent relation to the electromagnet 15, namely, the output shaft 13, the housing members 17 and 18, the clutch ring 42 and the gear carriers 35 and 36 are all made of a non-magnetic material as explained above, they will not divert any of the flux of the electromagnet and, hence, substantially all of the flux will be concentrated in the circuit or path 48 and will have maximum effectiveness on the clutch plate 43 for actuating the same. By reason of the fact that the electromagnet 15 will thus have only a minimum amount of stray flux, it will be seen that this magnet can be made smaller in size and weight and will require a smaller amount of electrical energy for producing the desired shifting force for the clutch plate 43.

When the housing members 17 and 18 and the gear carriers 35 and 36 are made of a molded non-metallic plastic material, as mentioned above, these members will be of a reduced weight in comparison with corresponding members made of metal. The use of molded plastic material for the housing members and the gear carriers, as well as the decreased size of the electromagnet 15, will considerably reduce cost at which this improved gear device 10 can be produced.

To prevent sticking of the clutch plate 43 in its disengaged position, this member is preferably provided with a group of axial projections 49, which are stamped or otherwise formed thereon, and which are engageable with the adjacent end of the electromagnet 15. These projections hold the clutch plate 43 in slightly spaced relation to the electromagnet such that the creation of a vacuum condition at this point will be prevented, and hence, the clutch plate can be quickly moved to its engaged position by the spring 34 when the electromagnet is deenergized.

To provide for good electrical conductivity through the gear device 10 from one to the other of the metal bearing members 20 and 21, particularly when the housing members 17 and 18 are made of a non-metallic plastic material, a metal conductor or ground strap 50 is provided as shown in Figs. 1 and 2. The ground strap 50 is supported by the molded housing 11 and has its ends in metallic engagement with the bearing members 20 and 21. The provision of the ground strap 50 provides good direct electrical conductivity at all times without need for the electric current to travel through the shaft members 12 and 13.

The planetary gearing 14 is here shown as comprising four of the planet gears 32 mounted on a corresponding number of the integrally molded pins 46 of the gear carrier 36, but it should be understood that, if desired, a smaller number of these planet gears can be used, for example two such gears, in which case the carrier 36 will have only two of the integrally molded pins 46, and hence, the molding operation and the required dies for producing this gear carrier as a molded article will be considerably simplified.

With respect to the various parts of this improved gear device 10 which have been referred to herein as being molded or made of a molded non-magnetic material, it should be understood that expressions of this character are used herein in a broad sense, in which they contemplate parts molded in various ways including die-casting and contemplate parts molded from various non-magnetic metals as well as parts molded from various thermosetting plastic materials.

From the foregoing description and the accompanying drawing it will now be readily understood that this invention provides an improved electromagnetic clutch which can be manufactured at a relatively low cost and can be smaller in size and lighter in weight by reason of the incorporation therein of the above-described component parts made of molded material and in which the flux of the electromagnet will accordingly be confined in a local path and thereby conserved and made more effective for actuation of the shiftable clutch member.

Although the improved magnetic clutch of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a magnetic clutch, a housing having a chamber therein, a pair of substantially aligned spaced hollow metal bearing members, driving and driven shaft members rotatable in said bearing members, relatively rotatable clutch members in said chamber and associated with said shaft members, an annular electromagnet in said chamber in surrounding relation to one of said shaft members and comprising a magnet coil and frame means of magnetic material disposed around said coil, one of said clutch members being axially shiftable relative to the other clutch member in response to energization of said coil, said housing comprising complemental molded plastic housing members defining said chamber and connected with said bearing members by having portions thereof molded in place around said bearing members, and an electrical conductor extending along and lying against said housing externally thereof and having its ends connected with said bearing members.

2. A magnetic clutch as defined in claim 1 in which said electrical conductor is a substantially flat metal strip.

3. In a magnetic clutch, a housing defining a clutch chamber, a pair of substantially axially aligned spaced hollow metal bearing members supported by said housing on opposite sides of said chamber, axially aligned driving and driven shaft members rotatably supported by said bearing members, an electromagnet in said chamber and comprising an annular coil encased in a hollow frame of magnetic material which includes a central sleeve having relatively fixed connection with one of said bearing members and extending therefrom into said chamber, one of said shaft members being of non-magnetic metal and disposed to extend through said sleeve and across said chamber, and a pair of cooperating clutch members in said chamber one of which is spaced from said electromagnet and connected for rotation with the other of said shaft members, the other of said clutch members being a disk armature for said electromagnet and being slidably supported by said one shaft member for movement in the space between said electromagnet and said one clutch member, said housing comprising complemental molded cup-shaped housing members of non-magnetic material having their open ends connected together.

4. A magnetic clutch as defined in claim 3 in which the adjacent ends of said bearing members have connecting portions provided with interlock means extending therearound, and in which said housing members are of non-metallic plastic material and are molded in place around said connecting portions and interlocked with the latter by said interlock means.

References Cited in the file of this patent

UNITED STATES PATENTS

| | | |
|---|---|---|
| 1,665,742 | Kingston | Apr. 10, 1928 |
| 2,315,298 | Thompson | Mar. 30, 1943 |
| 2,343,553 | Horowitz et al. | Mar. 7, 1944 |
| 2,490,044 | Garbarini et al. | Dec. 6, 1949 |
| 2,500,447 | Bitzer | Mar. 14, 1950 |